United States Patent Office 3,423,476
Patented Jan. 21, 1969

3,423,476
STABILIZED HALOCARBON COMPOSITIONS
Germano Patron, Venice, Italy, assignor to Montecatini-Edison S.p.A., Milan, Italy
No Drawing. Filed July 11, 1966, Ser. No. 563,996
Claims priority, application Italy, July 14, 1965, 15,909/65
U.S. Cl. 260—652.5                5 Claims
Int. Cl. C07c *17/40*

ABSTRACT OF THE DISCLOSURE

A stable composition of matter comprising a liquid aliphatic halogenated hydrocarbon and a stabilizing amount of a mixture comprised of: (1) at least one oxime of a lower alkanal; (2) at least one lower alkylene oxide; and (3) at least one N,N-di-lower alkyl hydrazone of benzaldehyde.

---

The present invention relates to the stabilization against decomposition of halogenated hydrocarbons. More particularly, this invention relates to the stabilization against decomposition of chlorinated hydrocarbons such as trichloroethylene and tetrachloroethylene, which hydrocarbons are used as solvents in various industrial processes.

As is well known, chlorinated hydrocarbons, in particular trichloroethylene and perchloroethylene, are widely used in many technical processes, chiefly as solvents for fats and other organic substances, such as, for example, the degreasing of metals, the extraction of oils and fats, the dry-cleaning of textiles, and the like.

Due to the action of heat, oxygen, light and water, these chlorinated hydrocarbons tend to decompose forming acid products, such as hydrochloric acid; poisonous products, such as phosgene; tarry substances, etc., which give rise to serious problems, both during storage and transport, as well as during their use and during recovery operations of the solvent itself.

Furthermore, this decomposition is accelerated via the presence of metals or metal salts, as well as by the direct or indirect products of the decomposition itself, and moreover, it is autocatalytic.

All these drawbacks are particularly serious in the case of degreasing of metals, particularly of metals containing iron or aluminium, wherein because of the severe operational conditions to which the solvent is subjected under the contemporaneous and prolonged action of heat, oxygen, humidity and of the metal itself, considerable decomposition of the solvent takes place, decomposition that in turn is accelerated by the chlorides which are formed by the action of hydrochloric acid which is released upon the metal, thus causing serious corrosion on the metal pieces undergoing the degreasing treatment.

It is, therefore, of fundamental importance in industry to prevent the decomposition of chlorinated solvents or to neutralize the damaging effect of the decomposition products.

For this purpose, it is common technical practice to add to the solvent suitable stabilizing agents. Many and varied stabilizing agents have been suggested for this purpose; in particular they are antioxidants, i.e., compounds which inhibit the action of air or which are acid acceptors functioning to neutralize the acidity that gradually forms, thereby hindering the possibility of auto-catalytic decomposition reactions.

The stabilizing system must furthermore be such as to ensure the neutrality of the solvent even under the most severe conditions (the alkalinity of the solvent, imparted by stabilizers having a strong basic character, is just as harmful as the acidity because it makes the solvent unsuited for the degreasing of amphoteric metals, such as aluminium and zinc), and furthermore it must exert a lasting stabilizing action both in the liquid, as well as in the vapor phase of the degreasing processes.

The necessity for the contemporaneous presence of all of the hereinbefore mentioned characteristics creates a situation whereby the greatest number of the stabilizing agents hitherto suggested are definitely unsuited for effective and lasting stabilization of chlorinated solvents.

Thus, a primary object of this invention is that of providing a new and efficient stabilizing system for halogenated hydrocarbons, particularly suited for chlorinated solvents to be used in the degreasing of metals, which additionally provides a sure and lasting antioxidizing action, such as to ensure the inhibition of the formation of phosgene and hydrochloric acid, and which will also guarantee the neutrality of the solvent even under the most severe conditions.

It has been found according to the present invention that a stabilizing action of a sure and lasting effectiveness against the decomposition of halogenated hydrocarbons, in particular of chlorinated hydrocarbons used as solvents for the degreasing of metals, is achieved by adding to the halogenated solvent small quantities of a synergistically active combination of different additives.

Such a combination comprises an oxime, an epoxy, and a hydrazone or a phenol. If desired, the four component oxime, epoxy, hydrazone and phenol composition may be used.

The oximes of this invention comprise the oximes of aliphatic aldehydes having from 1 to 3 carbon atoms, in particular acetaldoxime and propanaldoxime; the epoxides are generally lower alkylene oxides wherein the two carbon atoms with the epoxy linkage are part of an aliphatic carbon chain and are preferably selected from the group consisting of butylene oxide, amylene oxide, and chloropropylene oxide.

The hydrazones suited for the purpose of this invention comprise the dialkylhydrazones produced by condensation of N,N-dialkyl substituted hydrazines with aliphatic or aromatic aldehydes; in particular excellent stabilizing properties are exhibited by the dimethylhydrazone of benzaldehyde.

As phenols suited for the purpose of this invention, there may be mentioned thymol, phenol, o-nitrophenol, eugenol isopropyl-p-hydroxyanisole, p-tertiary-amyl-o-butylphenol, hydroquinone-methylether, p-tert-butyl-catechol.

None of these additives taken singularly or in binary combination exerts a stabilizing action sufficient to avoid the degrading of the chlorinated hydrocarbons, while their combination, according to this invention, not only increases the stabilization power synergistically, but also does not present any of the disadvantages generally associated with the use of a combination of different products, such as, for example, the incompatibility of the different compounds with each other or the excessive quantity that may become necessary in order to ensure good stabilization.

The amount of stabilizers to be added to the halogenated solvent and the corresponding quantities of the single components of the synergic mixture obviously depend on the type of solvent to be stabilized, on the use contemplated for the solvent, on the desired degree of stabilization and on the presence of yet other additives.

In general, for the most common applications, there are used concentrations varying from 0.001 to 0.1% by weight with respect to the solvent to be stabilized of the oxime; from 0.01 to 1% of the epoxy; from 0.001% to 0.05% of the phenol and from 0.001% to 0.1% of the dialkylhydrazone.

Greater quantities may be used, but the same are not necessary. Obviously, to the synergistic mixture there may be added, for each of the classes of compounds mentioned, one or more of these compounds, for example, to comprise the weight percent of oximes there may be used acetaldoxime plus propanaldoxime.

More particularly, systems exceptionally effective for the stabilization of trichloroethylene are mixtures of an epoxy, such as butylene oxide and/or propylene oxide, in quantities varying from 0.05% to 0.3%; an oxime, such as acetaldoxime and/or propanaldoxime, in quantities from 0.005% to 0.05% and by a hydrazone, such as N,N-dimenthylbenzalhydrazone, in quantities from 0.005% to 0.05%; or by an epoxy, such as butylene oxide and/or propylene oxide; by an oxime, such as acetaldoxime and/or propanaldoxime in the quantities indicated above; and by a phenol, such as p-tert-butylcatechol and/or thymol, in quantities from 0.001% to 0.01%.

Trichloroethylene stabilized according to this invention does not exhibit any tendency to decompose, either during storage or during use under the most severe operational conditions in the degreasing of metals and in the recovery and regeneration operations by distillation of the solvent used.

The stabilizers according to this invention exerts its stabilizing action on the solvent both in the liquid, as well as in the vapor phase in the degreasing operations or, in general, when it is subjected to distillation and it is recovered together with the solvent during recovery operations of the same.

Even after prolonged technical treatments, the trichloroethylene remains limpid and clear.

For certain applications, it may be, furthermore, convenient to use the stabilizing system of this invention in combination with other stabilizers, such as amines, esters, alcohols, hydrocarbons, and the like.

Besides trichloroethylene and perchloroethylene, various other halogenated hydrocarbons may be protected against degradation by means of the stabilizers of this invention, such as, for example, chloroform, methylchloroform, methylene chloride, carbon tetrachloride, dichloroethylene, trichloroethane, vinylidene chloride, vinyl chloride, and the like.

Further characteristics and advantages of this invention are clearly evidenced by the examples recorded in the following table, wherein samples of trichloroethylene stabilized with the stabilizers and in the quantities recorded have been evaluated, as to their stability characteristics in accordance with the accelerated oxidation tests specified by the U.S.A. Army-Navy-Aeronautical Specification MIL-T7003 and Federal Specification OT-634/a Standards.

Such a stability test consists of reflux boiling for 48 hours in a 500 ml. flask 200 ml. of trichloroethylene mixed with the recorded quantities of stabilizer, and bubbling through the same, by means of a glass tube of 3 mm. $\phi$ oxygen, saturated with water, at a rate of 10–12 bubbles per minute; in the vapor phase there is suspended a small steel plate sized $\frac{1}{2}''$ x $2''$ x $\frac{1}{16}''$ and in the liquid phase there is introduced another small steel plate sized $\frac{1}{4}''$ x $\frac{3}{4}''$ x $\frac{1}{16}''$. As a light and heat source there is used a sanded 150 watt bulb placed under the flask.

At the end of the test, the acidity of the trichloroethylene, that is the pH value of the aqueous extracts, is established by using in all instances the same water/trichloroethylene ratio (1:1).

The results are reported in Table I wherein the percentage of the different additives are given in parts by weight with respect to the trichloroethylene.

From the above results, the effectiveness of the stabilization of trichloroethylene according to this invention is readily apparent.

In point of fact, by using the mixture of an oxime, epoxy, hydrazone and/or phenol, the pH remains neutral, while the use of single compounds or the same compounds only in a binary combination do not afford comparable results.

Varying the stabilizing system, that is by substituting one of the compounds of the stabilizing system according to this invention with other compounds of known stabilizing action, it will be noticed that the pH of the trichloroethylene after the accelerated oxidation test evidences unsatisfactory values.

TABLE I

| Ex. No. | Stabilizer | Percent weight | Initial pH | pH after OT/MIL Test |
|---|---|---|---|---|
| 1 | Propylene oxide | 0.25 | 7.0 | 2.0 |
| 2 | Butylene oxide | 0.25 | 7.0 | 2.0 |
| 3 | Acetaldoxime | 0.015 | 7.0 | 1.7 |
| 4 | Propanaldoxime | 0.015 | 7.0 | 1.3 |
| 5 | N,N-dimethyl-benzalhydrazone | 0.003 | 7.0 | 4 |
| 6 | p-Tert-butyl-catechol | 0.002 | 7.0 | 2 |
| 7 | Propanaldoxime / Acetaldoxime | 0.0075 / 0.0075 | 7.0 | 1.4 |
| 8 | Butylene oxide / Acetaldoxime / Propanaldoxime | 0.25 / 0.0075 / 0.0075 | 7.0 | 1.8 |
| 9 | Propanadoxime / Butylene oxide | 0.015 / 0.25 | 7.0 | 1.7 |
| 10 | Acetaldoxime / Butylene oxide | 0.015 / 0.25 | 7.0 | 1.7 |
| 11 | Butylene oxide / N,N-dimethylbenzalhydrazone | 0.25 / 0.003 | 7.0 | 4 |
| 12 | Acetaldoxime / N,N-dimethylbenzalhydrazone | 0.015 / 0.005 | 7.0 | 5 |
| 13 | Propanaldoxime / N,N-dimethylbenzalhydrazone | 0.015 / 0.005 | 7.0 | 4 |
| 14 | p-Tert-butylcatechol / Butylene oxide | 0.002 / 0.25 | 7.0 | 2 |
| 15 | p-Tert-butyl-catechol / Propanaldoxime | 0.002 / 0.015 | 7.0 | 4 |
| 16 | Butylene oxide / Propanaldoxime / N,N-Dimethylbenzalhydrazone | 0.25 / 0.015 / 0.002 | 7.0 | 7.0 |
| 17 | Butyl oxide / Acetaldoxime / Propanaldoxime / N,N-dimethylbenzalhydrazone | 0.25 / 0.0075 / 0.0075 / 0.002 | 7.0 | 7.0 |
| 18 | Butylene oxide / Acetaldoxime / Propanaldoxime / p-Tert-butylcatechol | 0.25 / 0.0075 / 0.0075 / 0.002 | 7.0 | 7.0 |
| 19 | Propylene oxide / Acetaldoxime / Propanaldoxime / p-Tert-butyl-catechol | 0.25 / 0.0075 / 0.0075 / 0.002 | 7.0 | 7.0 |
| 20 | Butylene oxide / Acetaldoxime / Propanaldoxime / Thymol | 0.25 / 0.0075 / 0.0075 / 0.002 | 7.0 | 7.0 |

As many apparently widely different embodiments of this invention may be made without departing from the spirit and scope thereof, it is to be understood that the same is not to be limited to the specific embodiments thereof, except as claimed in the appended claims.

What is claimed is:

1. A stable composition of matter comprising a liquid aliphatic halogenated hydrocarbon and a stabilizing amount of a mixture comprised of: (1) at least one oxime of a lower alkanal; (2) at least one lower alkylene oxide; and (3) at least one N,N-di-lower alkyl hydrazone of benzaldehyde.

2. The stable composition as defined by claim 1, wherein the liquid aliphatic halogenated hydrocarbon is selected from the group consisting of trichloroethylene, perchloroethylene, chloroform, methylchloroform, methylene chloride, carbon tetrachloride, dichloroethylene, trichloroethane, vinylidene chloride, vinyl chloride and mixtures thereof.

3. The stable composition as defined by claim 2, wherein the liquid aliphatic halogenated hydrocarbon is selected from the group consisting of trichloroethylene and perchloroethylene; and further wherein (1) is present in amounts of from between 0.001% and 0.1% by weight halocarbon; (2) is present in amounts of from between 0.01% and 1.0% by weight halocarbon; and (3) is present in amounts of from between 0.001% and 0.1% by weight halocarbon.

4. The stable composition as defined by claim 3, wherein (1) is selected from the group consisting of acetaldoxime, propanaldoxime and mixtures thereof; (2) is selected from the group consisting of butylene oxide, propylene oxide, amylene oxide, chloropropylene oxide and mixtures thereof; and (3) is N,N-dimethylbenzalhydrazone.

5. The stable composition as defined by claim 4, wherein (1) is present in amounts of from between 0.005% and 0.05% by weight halocarbon; (2) is present in amounts of from between 0.05% and 0.3% by weight halocarbon; and (3) is present in amounts of from between 0.005% and 0.05% by weight halocarbon.

No References Cited

LEON ZITVER, Primary Examiner.

M. JACOB, Assistant Examiner.

U.S. Cl. X.R.

252—153, 364